United States Patent
Romanovski et al.

(10) Patent No.: US 7,992,138 B2
(45) Date of Patent: Aug. 2, 2011

(54) METHOD AND APPARATUS FOR EXECUTING DIFFERENT JAVA METHODS

(75) Inventors: Alexei Romanovski, Seongnam-si (KR); Chong-mok Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1302 days.

(21) Appl. No.: 11/233,075

(22) Filed: Sep. 23, 2005

(65) Prior Publication Data

US 2006/0070044 A1   Mar. 30, 2006

(30) Foreign Application Priority Data

Sep. 25, 2004   (KR) .................. 10-2004-0077578

(51) Int. Cl.
*G06F 9/45* (2006.01)

(52) U.S. Cl. ........................ 717/136; 717/148

(58) Field of Classification Search ............... 717/5, 7, 717/9, 118, 148, 151, 159, 139, 136, 145, 717/146; 712/244
See application file for complete search history.

(56) References Cited

U.S. PATENT DOCUMENTS

| | | | | |
|---|---|---|---|---|
| 5,937,186 | A | * | 8/1999 | Horiguchi et al. ............ 712/244 |
| 6,009,517 | A | * | 12/1999 | Bak et al. ...................... 712/245 |
| 6,110,226 | A | | 8/2000 | Bothner |
| 6,292,935 | B1 | * | 9/2001 | Lueh et al. .................... 717/148 |
| 6,415,381 | B1 | * | 7/2002 | Bak et al. ...................... 712/244 |
| 6,513,156 | B2 | * | 1/2003 | Bak et al. ...................... 717/151 |
| 6,535,903 | B2 | * | 3/2003 | Yates et al. .................... 718/100 |
| RE39,519 | E | * | 3/2007 | Bak et al. ...................... 712/244 |
| 2002/0007432 | A1 | * | 1/2002 | Ahern .......................... 710/305 |
| 2003/0018679 | A1 | | 1/2003 | Sokolov et al. |
| 2003/0182655 | A1 | * | 9/2003 | Hundt et al. .................. 717/158 |
| 2003/0204838 | A1 | * | 10/2003 | Caspole et al. ............... 717/130 |
| 2004/0054798 | A1 | * | 3/2004 | Frank et al. ................... 709/229 |
| 2004/0236927 | A1 | * | 11/2004 | Irie et al. ...................... 712/209 |
| 2006/0294285 | A1 | * | 12/2006 | Ahern .......................... 710/305 |

FOREIGN PATENT DOCUMENTS

| | | |
|---|---|---|
| KR | 10-2004-0044655 A | 5/2004 |
| WO | WO 03/19368 A2 | 3/2003 |

* cited by examiner

*Primary Examiner* — Anna Deng
(74) *Attorney, Agent, or Firm* — Sughrue Mion, PLLC

(57) ABSTRACT

A method and apparatus for executing different Java methods are provided. The method of executing different Java methods, includes when a first method calls a second method, storing information for returning to the first method in a first stack frame, adding a second stack frame for the second method to a stack, and storing information for executing the second method in the second stack frame, wherein the first stack frame and the second stack frame are included in the same stack in a same format.

28 Claims, 9 Drawing Sheets

METHOD AND APPARATUS FOR EXECUTING DIFFERENT JAVA METHODS

CROSS-REFERENCE TO RELATED APPLICATION

This application claims priority from Korean Patent Application No. 10-2004-0077578 filed on Sep. 25, 2004 in the Korean Intellectual Property Office, the disclosure of which is incorporated herein by reference in its entirety.

BACKGROUND OF THE INVENTION

1. Field of the Invention

Apparatuses and methods consistent with the present invention relate to executing different Java methods.

2. Description of the Related Art

Object-oriented programming is a method of developing a computer program and is based on an object and data rather than an action and logic. Traditionally, programs were typically considered as performing logic operations, that is, receiving an input, processing the input and outputting a processing result. Programming was considered as a method of writing logic rather than a method of defining data. Conversely, object-oriented programming is an approach having a view such that an object is more important than logic in a program. Examples of an object include a human being (described by a name, an address, etc.), a building, a retailer store (whose properties can be described and handled) for selling goods, and a very small element such as a button or a scroll bar on a desktop of a computer.

The first stage of the object-oriented programming is an operation which is generally referred to as data modeling for identifying all objects to be handled and the relation between the objects. After all objects are identified, they are generalized into object classes, and types of data that the object classes contain and all logical sequences that can handle the object classes are defined.

A logical sequence is called a method, and an actual instance of a class is called a single "object" or a single "class activator" in some cases. An object or an activator is executed on a computer. A method defines a computer instruction and the properties of a class object define the related data.

Java is programming language which is designed to be used particularly in a distributed environment of the Internet. Java code appears similar to C++ language but Java is easier to use than C++ and enhances complete object orientation of programming. Java can be used to produce an application program which is executed in a single computer or in a distributed client/server environment on a network. In addition, Java can also be used to produce a small application program module or applet used as a part of a web page. Applets enable users to interact through a web page.

Meanwhile, a Java program can be executed using an interpreter scheme or a compiler scheme. In the interpreter scheme, program codes are read one by one and executed. In the compiler scheme, a code written in machine language is executed. Since instructions are executed one by one, the interpreter scheme does not burden a system but is very slow in comparison. The compiler scheme is faster than the interpreter scheme but requires a large amount of memory capacity since the entire program is loaded into memory.

FIG. 1 illustrates a method by which a Java class code is operated by an interpreter and a compiler. A Java source code 1 is an original program code that is written in accordance with the format of Java language using an editor. The Java source code 1 is human readable but is not machine readable. The Java source code 1 is compiled using a bytecode compiler 2 into machine language, i.e., a bytecode 3, which is executed in a Java virtual machine 500. The Java virtual machine 500 serves as an emulator executing the bytecode 3. The Java virtual machine 500 independently executes the bytecode 3 in hardware. The same bytecode 3 can be executed in different types of hardware because the Java virtual machine 500 emulates the hardware.

The Java virtual machine 500 executes the bytecode 3 in specific hardware or a specific operating system (OS). For execution, an interpreter 510 that interprets instructions one by one using the interpreter scheme and a compiler 520 that compiles the bytecode 3 to machine language and directly executes the bytecode 3, which is in machine language form, using the compiling method are present.

Meanwhile, the Java virtual machine 500 executes a bytecode differently according to an execution frequency of a method. For example, when a method has not been frequently called, a bytecode in the interpreter scheme (hereinafter, referred to as an "interpret code") is executed. When a method has been frequently called, a compiled machine code (hereinafter, referred to as a "native code") is executed. Accordingly, when a call between different Java methods occurs, management of a stack which stores execution states such as a parameter, a return address, and a local variable, is needed in order to take into account the characteristics of the Java virtual machine 500. In particular, a method that has been executed in the interpreter scheme should be able to be executed in the compiler scheme at any time in order to increase execution performance. Conversely, to reduce the use of memory, a method that has been executed in the compiler scheme should be able to be executed in the interpreter scheme. Thus, it is important for a Java virtual machine 500 to be able to provide interoperability between different methods. Many methods of managing a stack when a call occurs between different methods have been proposed.

FIG. 2 illustrates a conventional technology of managing a stack with respect to a call occurring between different methods. The conventional technology relates to performing a call between methods using a mixed execution stack, as disclosed by U.S. Pat. No. 6,009,517. A frame for a method which is executed in an interpret code (i.e., a Java frame) and a frame for a method which is executed in a native code (i.e., a C++ frame) are stored in a single execution stack. In the control flow between the frames, information is exchanged through an entry frame that is present between the frames. However, a frame of the interpret code and a frame of native code are constructed in different formats and it is very complicated to convert the frame of native code into the frame of the interpret code when changing the compiled method into the interpreter method is needed.

FIG. 3 illustrates a conventional technology of translating a bytecode into a compiled code. An interpreter 22 and a compiler 23 are included in a Java virtual machine 24 and execute a class file 21, as disclosed by U.S. Pat. No. 6,292, 935. When a native method which is generated using the compiler 23 calls a method of an interpret code, the interpret code is unconditionally compiled by the compiler 23 so that a single stack structure can be used. As a result, interoperability can be achieved. However, reduction of a memory occupation rate, which is an advantage of the interpreter 22, is not accomplished because even codes that can be executed by the interpreter 22 are compiled.

FIG. 4 illustrates a conventional technology in which a bytecode and a compiled code refer to different stacks. A stack 31 for a method executed using an interpreter and a stack 32 for a native method are independently configured and managed, as disclosed by U.S. Pat. No. 6,604,167. Here, since different formats of frames exist in different stacks, respectively, it is difficult to use this technology when an execution scheme for the method is changed.

According to the above-described conventional technologies, in order to accomplish interoperability between methods, a single stack is configured for different formats of frames, different formats of frames are respectively stored in different stacks, or an interpret code is translated into a compiled code. However, these technologies do not increase real-time interoperability between an interpret code and a compiled code. When the different stack frames are used, rapid code conversion and execution cannot be guaranteed. In particular, when a digital apparatus uses embedded Java, it is necessary to use a single common format of a stack to accomplish interoperability between an interpret code and a native code and translation between codes appropriate to memory capacity.

SUMMARY OF THE INVENTION

The present invention provides a method and apparatus for executing different Java methods using a single united format of a Java execution stack, thereby increasing interoperability between the different Java methods.

Aspects of the present invention will become clear to those skilled in the art upon review of the following description.

According to an aspect of the present invention, there is provided a method of executing different Java methods, including storing return information which returns execution to a first method in a first stack frame if the first method calls a second method, adding a second stack frame of the second method to a stack, and storing execution information the second method in the second stack frame, wherein the first stack frame and the second stack frame are each included in the stack in a same format.

According to another aspect of the present invention, there is provided a Java virtual machine for executing different Java methods, including an interpreter which executes bytecode, a compiler which compiles the bytecode to generate native code, and a code buffer manager which manages memory for the native code which is compiled, wherein the Java virtual machine stores return information which returns execution to a first method in a first stack frame of the first method which is included in a stack, adds a second stack frame of a second method to the stack, and stores execution information of the second method in the second stack frame if the first method, which is executed using the interpreter or as native code, calls the second method, and the first stack frame and the second stack frame are each included in the stack in a same format.

According to still another aspect of the present invention, there is provided a digital apparatus including an auxiliary memory unit storing a Java virtual machine that executes different Java methods, a main memory unit allocating memory to the Java virtual machine, an input/output unit transmitting and receiving data to and from the Java virtual machine, and a control unit controlling the main memory unit, the Java virtual machine, and the input/output unit, the Java virtual machine comprising an interpreter executing bytecode, a compiler compiling the bytecode to generate native code, and a code buffer manager managing memory for the compiled native code, wherein the Java virtual machine stores return information which returns execution to a first method in a first stack frame for the first method which is included in a stack, adds a second stack frame for a second method to the stack, and stores execution information of the second method in the second stack frame if the first method, which is executed using the interpreter or as native code, calls the second method, and the first stack frame and the second stack frame are included in the same stack in a same format.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF THE EXEMPLARY EMBODIMENTS OF THE INVENTION

Figure 1:
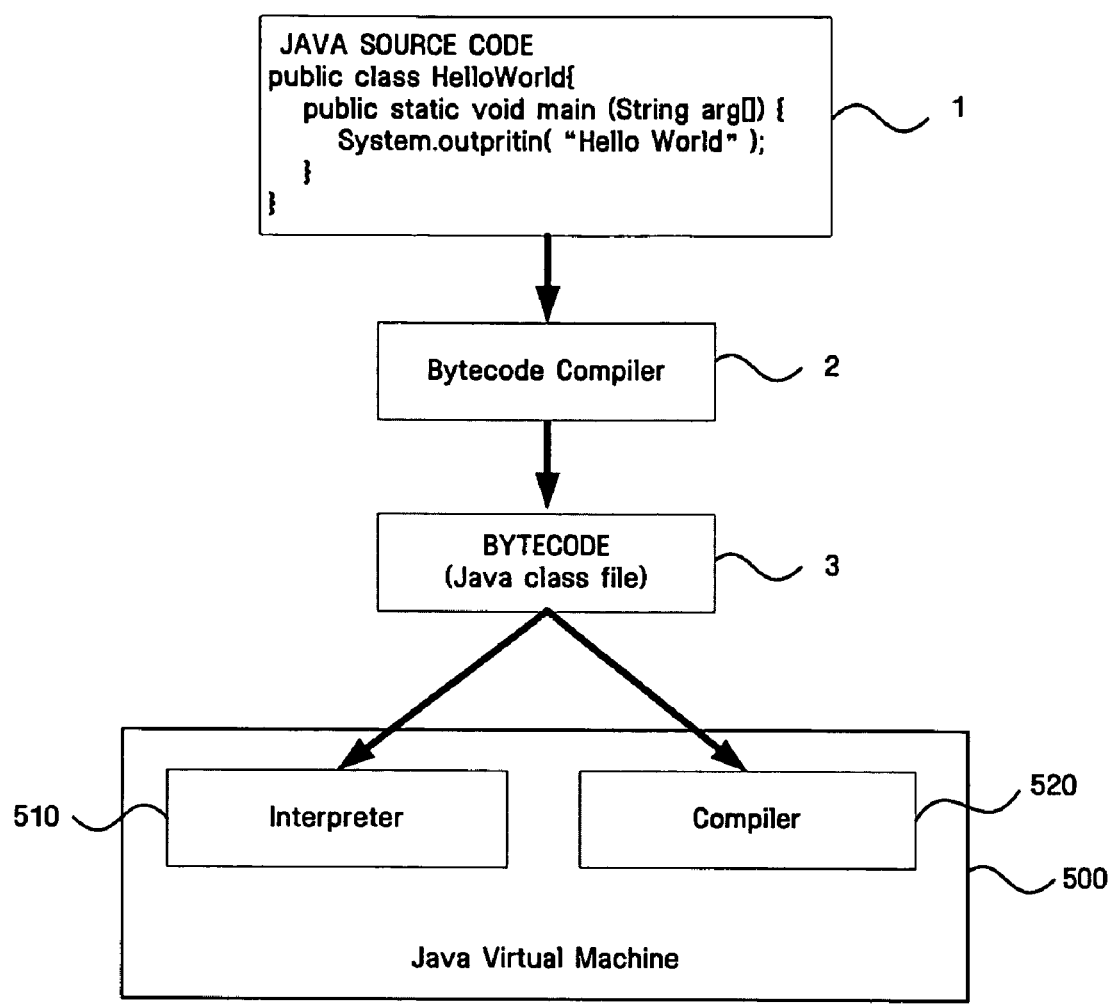
FIG. 1 illustrates a method by which a Java class code is operated by an interpreter and a compiler.
Figure 2:
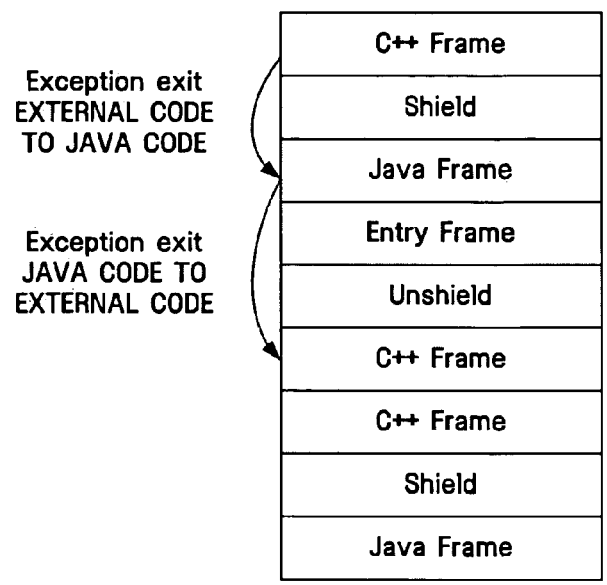
FIG. 2 illustrates a conventional technology of handling exception occurring between different types of codes.
Figure 3:
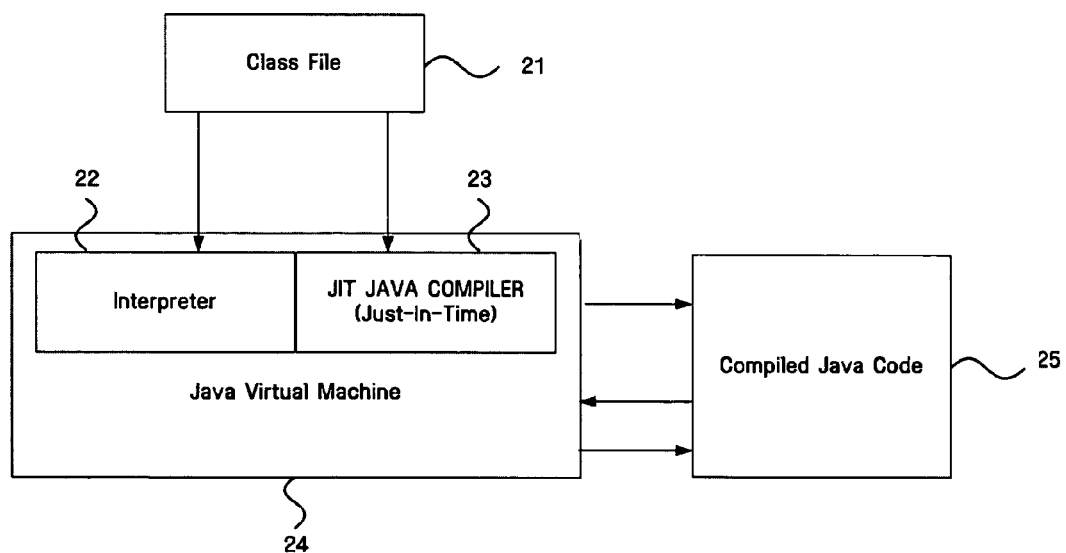
FIG. 3 illustrates a conventional technology of translating a bytecode into a compiled code.
Figure 4:
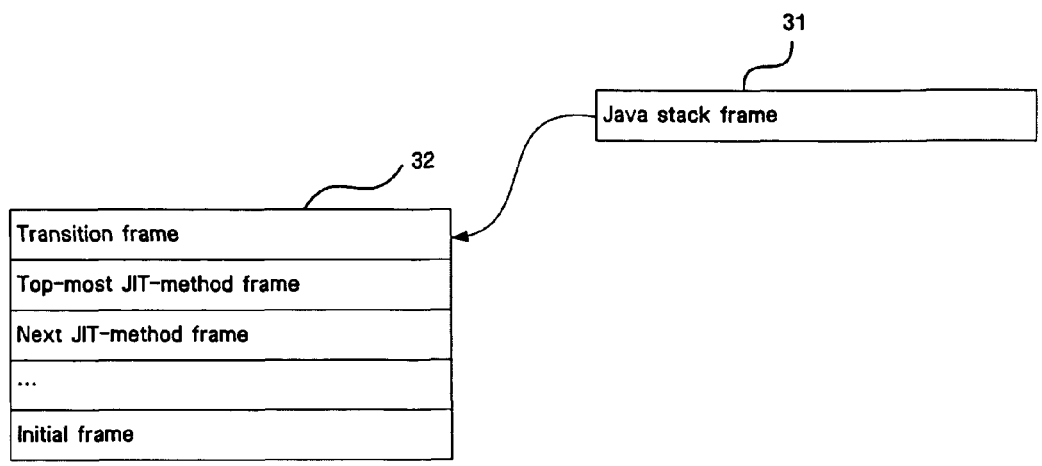
FIG. 4 illustrates a conventional technology in which a bytecode and a compiled code refer to different stacks.

Aspects of the present invention will now be described more fully with reference to the accompanying drawings, in which exemplary embodiments of the invention are shown.

Terms used in this specification will be described below.

Java Application

A Java application is a program executed by a Java virtual machine using Java objects. Java applications include an applet, an Xlet, and Midlet.

Java Compiler

A Java compiler compiles a hardware-independent bytecode to a machine language which is suitable to specific hardware. The Java compiler includes a Just-In-Time (JIT) compiler installed within a Java virtual machine. Also, there is an Ahead-On-Time (AOT) compiler. In exemplary embodiments of the present invention described below, the JIT compiler will be described, but any compiler that compiles a bytecode may also be used.

Applet

A Java applet is a Java program that is contained in a HyperText Markup Language (HTML) page and can be executed by a Java-compatible web browser. When the Java-compatible web browser displays the HTML page containing the Java applet, the browser downloads a Java applet code from a web server and executes the Java applet code in a particular section within the HTML page.

The applet is an embedded application which is executed by a web browser. Since a web page on which the applet is executed provides a region in which the applet is displayed, the applet is closely related with the web page containing the applet.

There are four states in an applet's life-cycle: loaded, stopped, started and destroyed. When the applet is loaded, an instance of the applet is generated but is not yet initialized. When the applet is stopped, the applet is initialized but is not yet executed. When the applet is started, the applet is activated. When the applet is destroyed, the applet is terminated and the applet instance returns all resources and waits until memory is removed through a garbage collection operation. Memory that was removed can be allocated to another method or application.

Midlet

A Midlet is a Mobile Information Device Profile (MIDP) application. Unlike the applet, the Midlet is managed not by a web browser but by software specially created to control an application which may be installed in a device such as a two-way pager or a mobile phone. In the example of a pager or mobile phone, the application must not hinder the reception of an incoming call which is received when the application is being executed. Accordingly, this type of external management is appropriate for an application which is executed in a wireless device.

Xlet

An Xlet was originally a part of a Java television (TV) Application Programming Interface (API) but is also used by a Personal Basis Profile (PBP) and the superset of PBP, i.e., a Personal Profile (PP). When the Xlet is destroyed, it is terminated and the Xlet resources are returned and garbage is collected.

Stack Frame

A stack frame is stored for a method in a stack that stores information needed to execute methods. The stack frame includes a program counter, a local variable, and a return address which are necessary to execute a method. The program counter is a pointer which points to an instruction to be executed for the method. The return address is an address which is returned to after the method is executed. For example, when method A calls method B, a position to which method A calls method B may be designated by the program counter for method A and may be a particular position of method A which is returned to after method B is completely executed. Hereinafter, a return stack frame indicates a stack frame for a method which has called another method, that is, for the calling method which returns after a stack frame for the called method is executed completely. The calling method is referred to as a return method.

A single method call constitutes a single stack frame. When a single method is called by a plurality of methods, the number of stack frames may increase with the number of calls. Accordingly, in exemplary embodiments of the present invention, one or more stack frames exist with respect to a single method.

Meanwhile, a bytecode stack frame is a stack frame for a method written in byte code. A native code stack frame is a stack frame for a method which is compiled to a machine language by a compiler.

Figure 5:
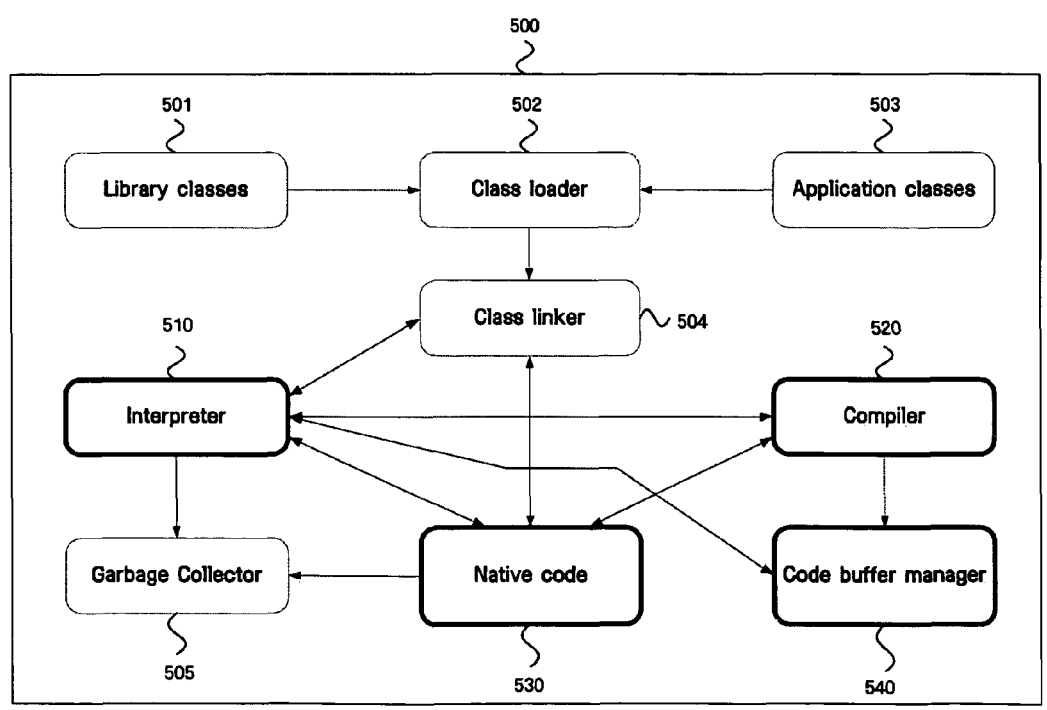
FIG. 5 illustrates a Java virtual machine according to an exemplary embodiment of the present invention.

FIG. 5 illustrates a Java virtual machine 500 according to an exemplary embodiment of the present invention. Library classes 501 are classes needed for Java execution. Application classes 503 are classes that are not included in the library classes 501 and that are developed or created by a user. The application classes 503 can be librarized and added to the library classes 501, and therefore, it is not necessary to distinguish the library classes 501 from the application classes 503. To execute such classes, a procedure for storing the classes in memory via a class loader 502 is required. A class linker 504 links the classes in the memory to functions. An interpreter 510 can use a native code 530 provided through the class linker 504. The interpreter 510 and a compiler 520 serve to execute a bytecode.

In exemplary embodiments of the present invention, in order to increase interoperability, a method of native code and a method of interpret code are stored as stack frames in a united format. Meanwhile, a current state of a compiled native code memory is checked using a code buffer manager 540, and an interpret code may be compiled and executed or a compiled code may be decompiled and executed using the interpreter 510. The code buffer manager 540 checks a current memory state to determine available memory space to be allocated to a compiled code and provides information regarding whether the Java virtual machine 500 will execute a code using either the interpreter 510 or the compiler 520.

The following describes the overall execution flow. When a Java virtual machine executes a first method using an interpreter scheme, a bytecode, i.e., an instruction comprised in the first method is fetched and executed. After the instruction is executed, a program counter (PC) is revised and a subsequent instruction is executed. During such procedure for translating instructions, when a second method is called, processing may be different according to a code of the second method or a system state. When the second method to be called is written in interpret code, a stack frame is made and the second method is executed. Information indicating that the second method is written in interpret code may be stored in the stack frame. The configuration of the stack frame will be described in detail with reference to FIG. 6 later.

When the second method is written in native code, a stack frame is also made and the second method is executed. Information indicating that the second method is written in native code may be stored in the stack frame. As described above, native code is stored in the same format of a frame in the same stack as the bytecode which is executed by an interpreter. Meanwhile, even an interpret code may be compiled before being executed, taking into account the convenience and speed of execution. An interpret code occupies small space in memory but has slow execution speed. Conversely, a compiled native code occupies larger space in memory than a bytecode but has a fast execution speed. Accordingly, when there is large space in a code buffer memory or when a method is frequently used, system performance can be increased by compiling the method to native code and storing in native code: When a compiled code is not likely to be used for some time or when current memory space is deficient, the compiled code may be removed from the code buffer memory and executed using the interpreter.

When a to-be-called method is in bytecode format and executed using the compiler 520, the Java virtual machine 500 requests the compiler 520 to compile a bytecode. The compiler 520 inquires to the code buffer manager 540 about whether sufficient memory space for compiling is present. If sufficient memory space is not present, the code buffer manager 540 decompiles a third method that has been compiled by the compiler 520. Decompiling is removing a method from the memory that has been compiled and loaded onto memory from the method and executing the second method in bytecode using the interpreter 510. Accordingly, memory occupied by native code of the method is removed from a code buffer. When necessary memory space is secured through such decompiling, the second method is compiled and executed. The second method is also stored as a frame in the single stack.

Information on the third method removed from the memory through decompiling still remains in the stack. Accordingly, when the third method is decompiled, information contained in a stack frame for the third method is revised. That is, the information indicates that the third method is interpret code, i.e., bytecode, instead of native code. Thereafter, when a time for execution of the stack frame for the third method occurs, the bytecode is read and the third method is executed by the interpreter 510. The third method may be executed in compiled code through compiling. In other words, the third method may be executed using the compiler 520 or may be executed in bytecode using the interpreter 510 according to available space in memory and processing time.

A method is performing a function in an object-oriented program. The method implies the conception of a function in a structural program but is more comprehensive than the conception of a function. The method indicates a function of an object in the object-oriented program. Since the object-oriented program includes objects, definition of each object, and methods of an object or a class, a method call is generated throughout the object-oriented program. Similar to a typical function, a method can call another method, which can call still another method. To execute a called method, it is necessary to store the called method as a frame in a stack. After the method is called and a particular function corresponding to the method is executed, an original method that has called the method must return. Such mechanism is implemented via a stack.

Accordingly, storing information on a method in a stack used to execute an instruction in order to execute the method is needed. A frame or a stack frame is configured in a particular format to store information on a single method in a stack. An execution stack may include one or more stack frames. Meanwhile, since Java is multi-threaded, multiple threads may be present. Here, a stack is given to each thread. When the same method is called in multiple threads, a stack frame for the method is separately present in an execution (or instruction) stack for each thread.

Figure 6:
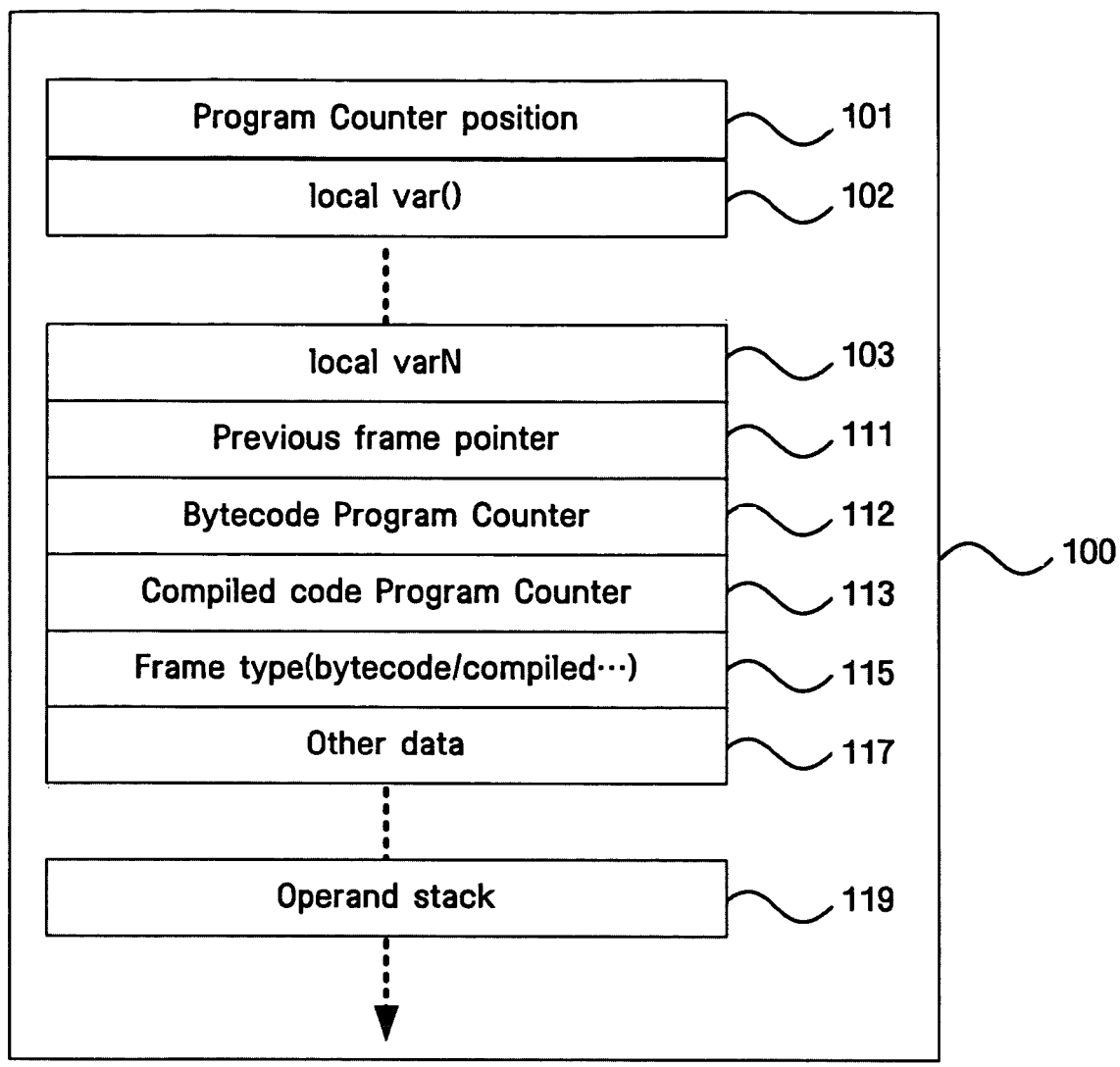
FIG. 6 illustrates the configuration of a stack frame used for method execution, according to an exemplary embodiment of the present invention.

FIG. 6 illustrates the configuration of a stack frame 100 used for method execution, according to an exemplary embodiment of the present invention.

Local variable fields 102 and 103 store information on each variable needed for the method execution. A previous frame pointer field 111 indicates a previous frame corresponding to the above-described return stack frame. The previous frame pointer field 111 contains position information of a stack frame for a calling method, which calls the current method. After a function of the current method corresponding to the stack frame 100 is executed, the frame pointer indicating the previous frame is needed since a frame (i.e., a return frame) that has called the current method must return to the previous frame. Subsequently, PC information is stored. The PC information is divided and stored in a bytecode PC field 112 and a compiled code PC field 113. The PC information is stored differently according to whether the method is interpret code or native code. A frame type field 115 stores a type of frame according to an implementation scheme to provide information on whether the method is compiled code or interpret code. Alternatively, the frame type field 115 may not be provided but a value may be set to NULL in the compiled code PC field 113 to indicate that the method is executed in bytecode. For clarity of the description, it is assumed that the frame type field 115 is contained in the stack frame 100 in exemplary embodiments of the present invention. Since whether the method is interpret code or native code is indicated by the frame type field 115, the bytecode PC field 112 and the compiled code PC filed 113 may be united into one PC field. In addition, other data field 117 stores other information which is needed for the method execution and an operand stack field 119 stores temporary values (or instructions) used during the method execution. The configuration shown in FIG. 6 is just an example, and other information may be further stored in the stack frame 100. The name of each field shown in FIG. 6 may be changed.

When a configuration as shown in FIG. 6 is used for methods in common, shift of control between methods written in different types of codes can be freely performed during program execution. In addition, since conversion between a compiled code and an interpret code is performed by simply changing a value of the frame type field 115, a scheme for method execution can be selected according to system performance. Meanwhile, since a Java stack is used in common, the method call, returning, and exception handling operations can be performed between interpret code and compiled code.

Figure 7:
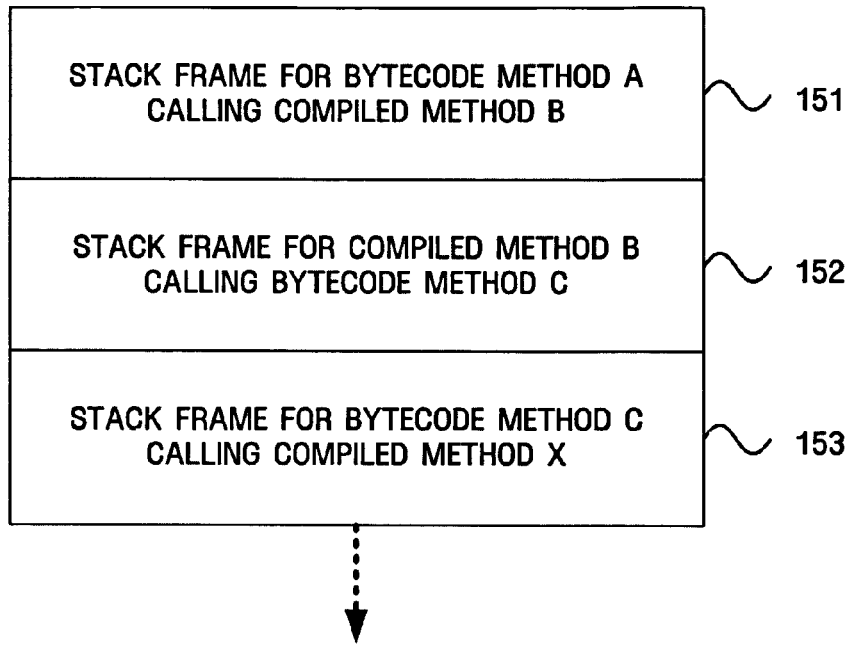
FIG. 7 illustrates the generation of a stack frame in response to a method call, according to an exemplary embodiment of the present invention.

FIG. 7 illustrates the generation of a stack frame in response to a method call, according to an exemplary embodiment of the present invention. The method call is generated between different types of codes. A method A is in bytecode and a stack frame 151 is for the method A. The method A calls a method B which is compiled native code. A stack frame 152 is for the method B. The method B is a native code but is stored in the same format of a stack frame as the method A in a single stack. The method B calls another method C which is executed in bytecode. A stack frame 153 is for the method C. As shown in FIG. 7, stack frames for different methods are present in a single stack and are stored in the same format, and therefore, shift of control in response to a method call is performed freely. In other words, when a function of the method C is completed, control returns to the method B that has called the method C. When a function of the method B is completed, control returns to the method A. Like a jump instruction, such returning is possible via an instruction shifting the flow of a program to a particular position. The jump instruction is just an example, and instead, another instruction such as a go instruction may be used according to the configuration of a system or machine language.

When a method is called within a single stack as shown in FIG. 7, a stack frame for a method whose function has been completed is removed. For example, when the function of the method C is completed and the frame B returns, the stack frame 153 for the method C is removed. Removing a stack frame means that a memory area occupied by the stack frame is indicated as an available area, and thus, other data or another stack frame can use the memory area when a memory request is subsequently received.

Figure 8:
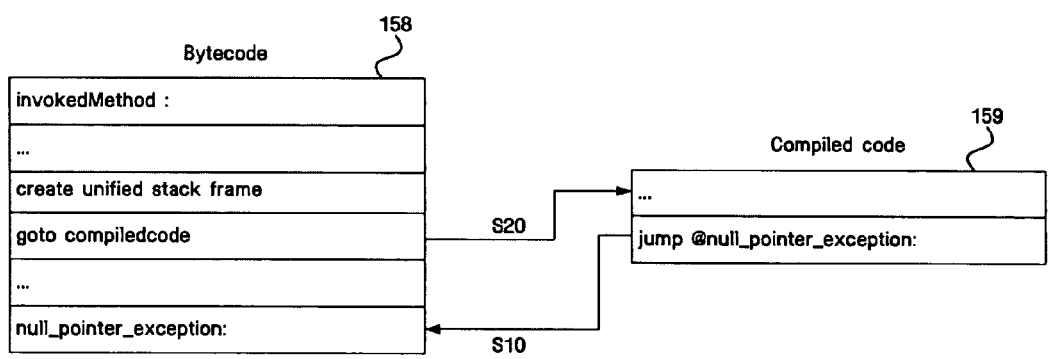
FIG. 8 illustrates the shift of a control through a method call between different types of codes, according to an exemplary embodiment of the present invention.

In addition, according to an exemplary embodiment of the present invention, a native code generated by a compiler can directly lead to a code of an interpreter. For example, when a native code is generated to lead to a code of an interpreter without directly generating a code for performing complicated exception handling used by a compiler, the amount of generated code for performing the exception handling will be reduced remarkably. FIG. 8 illustrates the shift of a control through a method call between different types of codes, according to an exemplary embodiment of the present invention. Referring to FIG. 8, there are two machine language codes: a bytecode 158, i.e., a machine language code of an interpreter (which performs an operation in machine language); and a compiled code 159, i.e., a native code generated by a compiler. After the native code is called by the interpreter, when an exception occurs during execution of the native code, exception handling is performed in the interpreter. When exception handling is needed in the native code, it is not performed within the native code, but control shifts to an exception handling routine (having an address of null_pointer_exception) existing in the interpreter (S10). After the null_pointer_exception is performed, the native code returns via a goto statement (S20).

Figure 9:
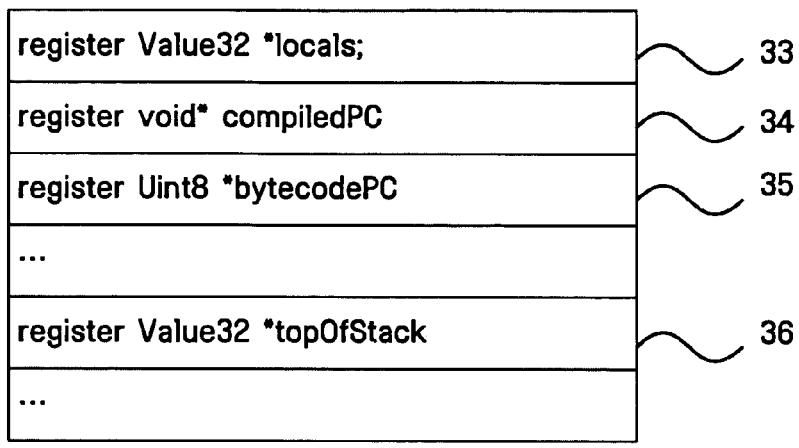
FIG. 9 illustrates a register shared by a bytecode and a native code according to an exemplary embodiment of the present invention.

FIG. 9 illustrates a register shared by a bytecode and a native code according to an exemplary embodiment of the present invention. The register is present between a compiled native code and a bytecode interpreter and includes a compiled PC 34, a bytecode PC 35, and a position of the top of a stack 36. A compiler which generates native code, e.g., a JIT compiler, generates a compiled native code based on the register so that the compiled native code shares the register with the bytecode. When the register is shared, execution of the native code can be quickly changed into execution by the interpreter at any time.

Figure 10:
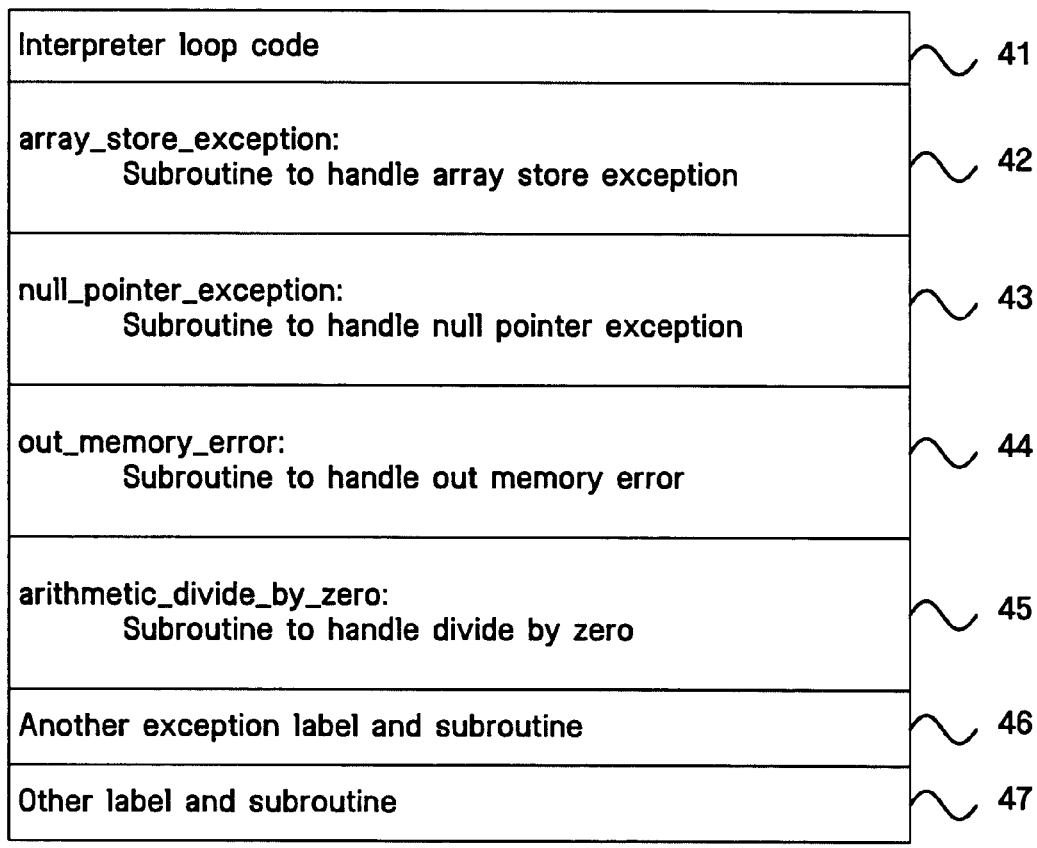
FIG. 10 illustrates an exception handling routine according to an exemplary embodiment of the present invention.

FIG. 10 illustrates an exception handling routine according to an exemplary embodiment of the present invention. A bytecode interpreter has a loop code 41. Examples of a label and a subroutine are shown in sections 42 through 47. The subroutines shown in FIG. 10 are for exception handling. A JIT compiler compiles a native code so that the compiled code can use a subroutine provided by the interpreter. Thereafter, when the native code calls an exception handling subroutine shown in FIG. 10, control shifts from the compiled code to a bytecode and information on a routine to be jumped to is obtained. Based on the information, a subroutine defined by the bytecode is performed. When the subroutine is finished, a position to be led to is determined by referring to a PC stored in a current stack frame so that a method that has been originally executed can be continuously executed.

Figure 11:
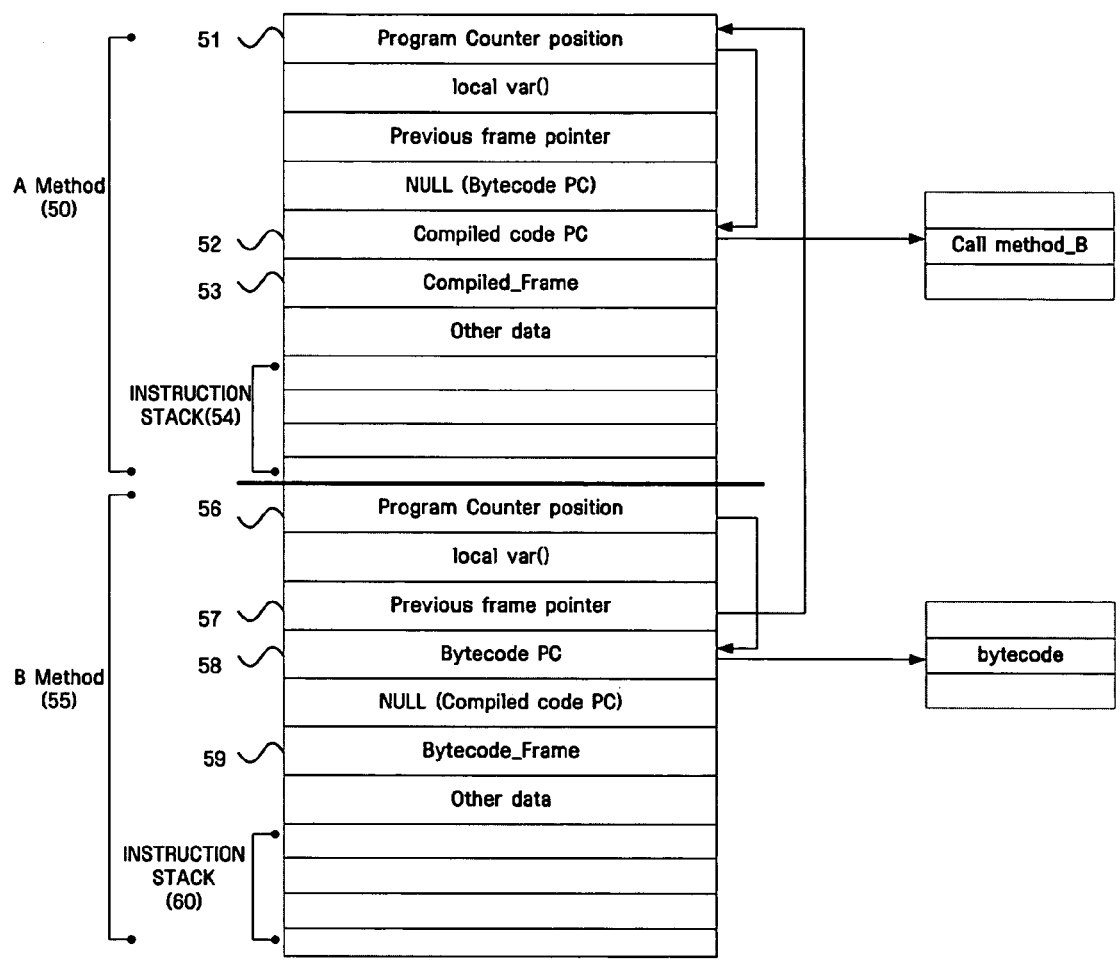
FIG. 11 illustrates the configuration of a stack corresponding to a method call according to an exemplary embodiment of the present invention.

FIG. 11 illustrates the configuration of a stack corresponding to a method call according to an exemplary embodiment of the present invention. Referring to FIG. 11, a method A calls a method B. A stack frame 50 for the method A includes a local variable field (local var( )), a previous frame pointer field, a compiled code PC field 52, a frame type field 53, and an operand stack field 54. The frame type field 53 indicates that the method A is compiled code. The compiled code PC field 52 indicates a current instruction that is being executed and a position of an instruction to be subsequently executed. To call the method B according to an instruction of Call method_B which is contained in the compiled code PC field 52, a stack frame 55 for the method B is generated in the same format as the stack frame 50 for the method A.

A previous frame pointer field 57 of the stack frame 55 indicates the start of the stack frame 50 for the method A calling the method B. The method B is written in bytecode and is executed using an interpreter. Accordingly, a position of an instruction is designated using a bytecode PC field 58. That the stack frame 55 is a bytecode frame is informed by a frame type field 59. When the execution of the method B is completed, the method A returns via the previous frame pointer 57. Continuously, an instruction can be read from an instruction stack 54 or 60 and executed.

Referring to FIG. 11, a bytecode PC for the method A has a value of NULL and a compiled code PC for the method B has a value of NULL. Although the method A is compiled code, it may be executed in bytecode when available memory space is not sufficient for execution as compiled code. In other words, instead of removing the compiled code from memory, the stack frame 50 is maintained while a compiled code PC is set to null, a bytecode PC is activated, the frame type field 53 is changed to indicate a bytecode frame, and a PC position field 51 is set to indicate the bytecode PC. Then, when the method A returns after the method B is completely executed, even if the method A is not compiled code but is in bytecode format, the method A can be executed. Since conversion between compiled code and bytecode is easily accomplished by changing only part of information contained in a stack frame, an execution scheme for a method can be adaptively selected according to system performance.

Figure 12:
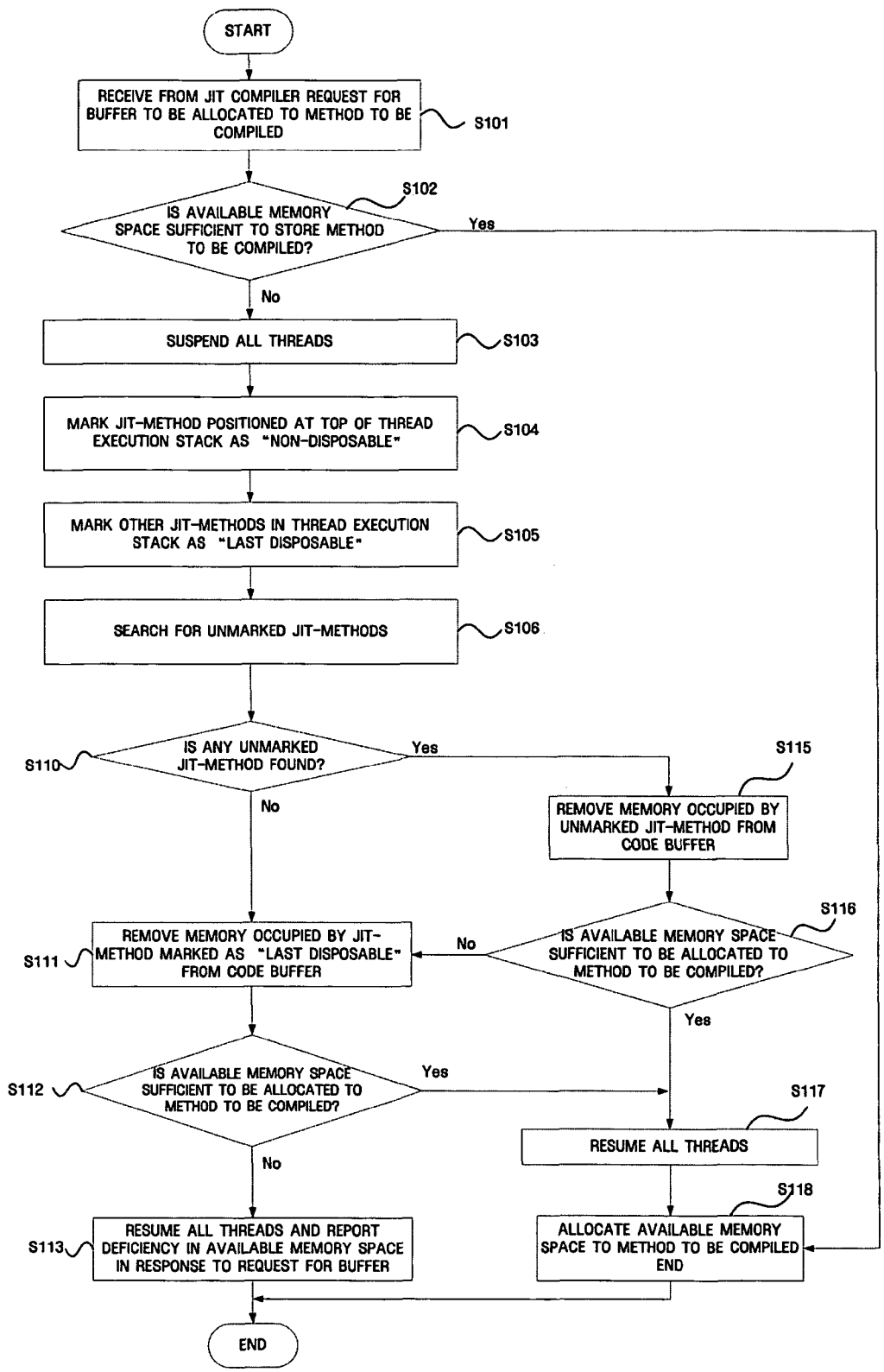
FIG. 12 is a flowchart of memory allocation according to an exemplary embodiment of the present invention.

FIG. 12 is a flowchart of memory allocation according to an embodiment of the present invention. It is assumed that a JIT compiler included in a Java virtual machine is used in the memory allocation shown in FIG. 12. In operation S101, a code buffer manager receives from the JIT compiler a request for a buffer to be allocated to a method to be compiled. In operation S102, the code buffer manager determines whether available space sufficient to store the method to be compiled is present in memory. If the available space is sufficient for the method, the code buffer manager allocates a memory space to the method to be compiled in operation S118.

However, if the available space is not sufficient for the method, sufficient memory space is secured. In operation S103, all threads are suspended. Since Java is multi-threaded, multiple threads may exist. Since each thread has a stack, multiple stacks may exist. Here, an execution stack is a stack for a thread that is currently under execution.

In operation S104, the code buffer manager marks a method, which has been compiled by the JIT compiler (hereinafter, referred to as a JIT-method) and which is positioned on the top of a thread execution stack, as "non-disposable." Since it is expected that the JIT-method at the top of the thread execution stack will be executed soon, removing the JIT-method at the top adversely affects performance. In operation S105, the code buffer manager marks JIT-methods, among all methods in the thread execution stack except for the JIT-method at the top, as "last-disposable." Since methods in the currently executed thread are highly likely to be executed at some point, the removal of these methods is considered only when there is no method to be removed from other stacks. Thereafter, in operation S106, the code buffer manager searches for unmarked JIT-methods. If any unmarked JIT-method is found in operation S110, memory occupied by the unmarked JIT-method is removed from a code buffer in operation S 115. If two or more unmarked JIT-methods are found in operation S110, which unmarked JIT-method will be removed is determined based on various criteria. For example, an unmarked JIT-method that is likely to be used later than any other unmarked JIT-methods may be selected, or an unmarked JIT-method that has a biggest code size may be selected. Alternatively, a plurality of unmarked JIT-methods may be removed. In operation S116, the availability of memory space sufficient to be allocated to the method to be compiled is determined. If it is determined that the available memory space is sufficient, all of the threads are resumed in operation S117 and the available memory space is allocated to the method to be compiled in operation S118.

Meanwhile, if any unmarked JIT-method is not found in operation S110, or if it is determined that the available memory space is not sufficient in operation S116, memory occupied by the method marked as "last-disposable" is removed from a code buffer in operation S111. Thereafter, in operation S112, it is determined whether available memory space is sufficient to be allocated to the method to be compiled. If the available memory space is determined to be sufficient, all of the threads are resumed in operation S117. However, if the available memory space is determined not to be sufficient in operation S112, all of the threads are resumed and the deficiency in available space is reported in response to the request for the buffer in operation S113.

During the memory allocation, since a common format is provided for stack frames for methods, even though compiled code for a method is removed from memory, the method can be executed in bytecode using an interpreter when it is resumed by changing a part (i.e., a frame type field) of a stack frame for the method from compiled code into bytecode. Thereafter, when the method is resumed, if available memory space is sufficient for the method, the method can be executed through compiling by changing the part of the stack frame from bytecode into compiled code.

Meanwhile, a plurality of stack frames may exist for a single method. For example, method B may be called by two methods A and C. In this case, two stack frames B1 and B2 may be generated for the method B in response to the calls from the methods A and B, respectively. Accordingly, in the memory allocation shown in FIG. 12, when the method B that has been a compiled as a native method is decompiled and the memory occupied by the method B is removed from a code buffer, changing both of the frame type fields of the respective stack frames B1 and B2 to bytecode is necessary.

Figure 13:
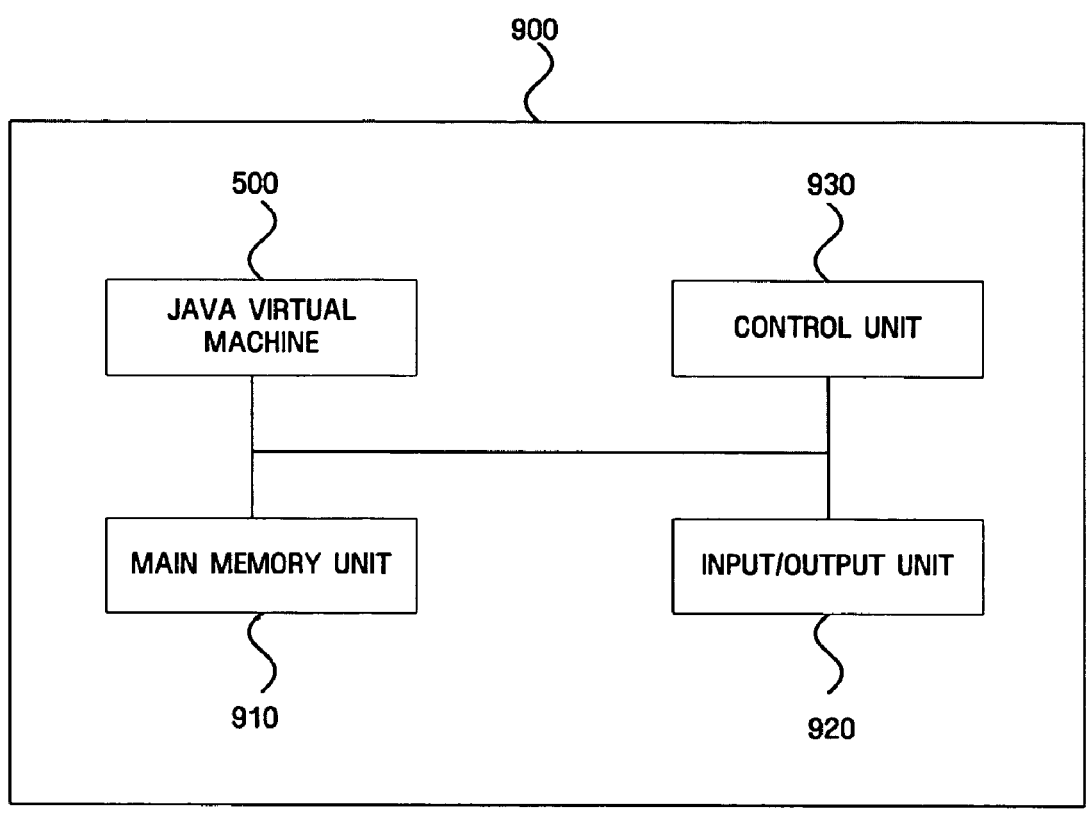
FIG. 13 illustrates a digital apparatus including a Java virtual machine according to an exemplary embodiment of the present invention.

FIG. 13 illustrates a digital apparatus 900 including a Java virtual machine 500 according to an exemplary embodiment of the present invention.

The term 'module', as used herein, refers to, but is not limited to, a software or hardware component, such as a Field Programmable Gate Array (FPGA) or Application Specific Integrated Circuit (ASIC), which performs certain tasks. A module may be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a communication system.

The Java virtual machine 500 performs particular functions of the digital apparatus 900. The Java virtual machine 500 may perform a function that shows a menu of digital TV and a function that shows received broadcasting information. In addition, when a digital TV is connected to Internet, the Java virtual machine 500 may function as a browser allowing use of the Internet and may provide a function that executes an applet, Midlet, and Xlet of the Internet. Moreover, the Java virtual machine 500 may be embedded in various types of digital apparatuses such as information apparatuses like mobile phones and personal digital assistant (PDA) and digital household appliances like refrigerators and microwave ovens. At present, the Java virtual machine 500 and embedded Java using the same are used in various digital apparatuses to implement wired/wireless communication with the Internet, home networking, ubiquitous networking, etc.

A main memory unit 910 provides memory so that the Java virtual machine 500 implements a stack and a buffer which are required to execute an application. The main memory unit 910 may be implemented as random access memory (RAM) such as dynamic RAM (DRAM), static RAM (SRAM), or synchronous DRAM (SDRAM). In exemplary embodiments of the present invention, the main memory unit 910 includes non-volatile memory such as RAM.

An input/output unit 920 transmits and receives data to and from the Java virtual machine 500. The input/output unit 920 transmits to the Java virtual machine 500 information on what application will be performed or a command for a Java application, which is entered by a user through an input device such as a remote control, a keyboard, a keypad, or a mouse. Then, the Java virtual machine 500 processes the input received from the input/output unit 920 and transmits result data of the input which is processed to the input/output unit 920, which outputs the received result data to an external output device such as a display unit or a speaker. In addition, when the result data needs to be transmitted to an external device through communication, the result data can be transmitted via the input/output unit 920.

A control unit 930 control information among the other elements of the digital apparatus 900 and controls the operation of the Java virtual machine 500. The control unit 930 may be implemented as a central processing unit (CPU).

According to the aspects of the present invention, interoperability between a compiled code and a code executed by an interpreter is increased and shift of control between different types of codes is possible.

In addition, since either compiled code or bytecode is readily used, a system can be used efficiently.

It will be understood by those of ordinary skill in the art that various changes in form and details may be made therein without departing from the spirit and scope of the present invention as defined by the following claims. Therefore, it is to be appreciated that the above described exemplary embodiments embodiment is are for purposes of illustration only and not to be construed as a limitation of the invention. The scope of the invention is given by the appended claims, rather than the preceding description, and all variations and equivalents which fall within the range of the claims are intended to be embraced therein.

What is claimed is:

1. A method of executing different JAVA methods, comprising:

storing return information which returns execution to a first method in a first stack frame if the first method calls the second method;

adding a second stack frame of the second method to a stack; and storing execution information of the second method in the second stack frame, wherein the first stack frame and the second stack frame are each included in the stack in a same format, and if the first method is JAVA native code then the second method is JAVA bytecode and if the first method is JAVA bytecode then the second method is JAVA native code, wherein the first stack frame comprises a field which indicates a current execution position of the first method, a field which indicates a position of a return stack frame which includes information on a return method which calls the first method, and data used to execute the first method, and wherein the field which indicates the current execution position comprises a bytecode program counter and a native code program counter.

2. The method of claim 1, wherein each of the first method and the second method is one of bytecode, which is executed using an interpreter, and native code, which corresponds to machine language which results from translation by a compiler.

3. The method of claim 1, when the first method or the second method is bytecode, further comprising:
translating the first method or the second method which is bytecode into native code using a compiler; and
changing the first stack frame or second stack frame to indicate that the translated first method or the translated second method which corresponds to the first stack frame or the second stack frame, respectively, is native code.

4. The method of claim 1, further comprising:
removing memory which is occupied by native code if the first method is native code; and
changing the first stack frame to indicate that the first method which corresponds to the first stack frame is bytecode.

5. The method of claim 1, wherein the storing the execution information of the second method comprises translating the bytecode into machine language using a compiler if the second method is bytecode.

6. The method of claim 5, wherein the translating the bytecode into the machine language comprises:
searching a code buffer for a third method which is in native code if available memory space in a code buffer is not sufficient to store the machine language;
removing memory which is occupied by native code of the third method from the code buffer if the third method exists; and
allocating the available memory space, which is increased by removing the memory which is occupied by the native code, to the second method.

7. The method of claim 6, wherein the searching of the code buffer for the third method comprises searching for a third stack frame, which is a native code stack frame in the stack which exists in the code buffer, and the stack is not used by a thread which is currently under execution.

8. The method of claim 6, further comprising changing each stack frame of the third method to indicate that each stack frame of the third method is a bytecode stack frame.

9. The method of claim 1, further comprising returning to the first stack frame after the second method is completely executed.

10. A JAVA virtual machine for executing different JAVA methods, comprising:
an interpreter which executes bytecode;
a compiler on a processor which compiles the bytecode to generate native code; and
a code buffer manager which manages memory for the native code which is compiled,
wherein the JAVA virtual machine stores return information which returns execution to a first method in a first stack frame of the first method which is included in a stack, adds a second stack frame of a second method to the stack, and stores execution information of the second method in the second stack frame if the first method, which is executed using the interpreter or as native code, calls the second method, and
wherein the first stack frame and the second stack frame are each included in the stack in a same format, and
if the first method is JAVA native code then the second method is JAVA bytecode and if the first method is JAVA bytecode that the second method is JAVA native code;
wherein the first stack frame comprises a field which indicates a current execution position of the first method, a field which indicates a position of a return stack frame containing information on a return method calling the first method, and data which is used to execute the first method, and
wherein the field which indicates the current execution position comprises a bytecode program counter and a native code program counter.

11. The JAVA virtual machine of claim 10, wherein each of the first method and the second method is one of bytecode which is executed using an interpreter and native code which corresponds to machine language which results from translation by a compiler.

12. The JAVA virtual machine of claim 10, wherein the code buffer manager translates the second method into native code using a compiler and the code buffer manager changes the second stack frame to indicate that the second method which corresponds to the second stack frame is native code if the second method is bytecode.

13. The JAVA virtual machine of claim 10, wherein the JAVA virtual machine searches the code buffer for a third method which is in native code, removes memory which is occupied by native code of the third method from the code buffer if the third method exists in the code buffer, and allocates the available memory space, which is increased by removing the memory which is occupied by the native code of the third method, to the second method if available memory space in a code buffer is not sufficient to store a machine language code which is generated by compiling bytecode of the second method using the compiler.

14. The JAVA virtual machine of claim 12, wherein the code buffer manager changes each stack frame of the third method to indicate that each stack frame of the third method is a bytecode stack frame.

15. The JAVA virtual machine of claim 13, wherein the code buffer manager changes each stack frame of the third method to indicate that each stack frame of the third method is a bytecode stack frame.

16. The JAVA virtual machine of claim 10, wherein the JAVA virtual machine returns to the first stack frame when the second method is executed completely.

17. A digital apparatus comprising:
an auxiliary memory unit which stores a JAVA virtual machine that executes different JAVA methods;
a main memory unit which allocates memory to the JAVA virtual machine;
an input/output unit which transmits and receives data to and from the JAVA virtual machine; and
a control unit which controls the main memory unit, the JAVA virtual machine, and the input/output unit,
the JAVA virtual machine comprising an interpreter which executes bytecode, a compiler which compiles the bytecode to generate native code, and a code buffer manager which manages memory for the native code which is compiled,
wherein the JAVA virtual machine stores return information which returns execution to a first method in a first stack frame for the first method which is included in a stack, adds a second stack frame for a second method to the stack, and stores execution information of the second method in the second stack frame if the first method, which is being executed using the interpreter or as native code, calls the second method, and
wherein the first stack frame and the second stack frame are each included in the stack in a same format, and
if the first method is JAVA native code then the second method is JAVA bytecode and if the first method is JAVA bytecode that the second method is JAVA native code,
wherein each of the first stack frame and second stack frame comprises a field which indicates a current execution position of the first method, a field which indicates a position of a return stack frame which includes information on a return method which calls the first method, and data which is needed to execute the first method, and wherein the field which indicates the current execution position comprises a bytecode program counter and a native code program counter.

18. The digital apparatus of claim 17, wherein each of the first method and the second method is one of bytecode which is executed using an interpreter and native code which corresponds to machine language which results from translation by a compiler.

19. The digital apparatus of claim 17, wherein the code buffer manager translates the first method or the second method into native code using a compiler and changes the first stack frame or the second stack frame to indicate that the translated first method or the translated second method which corresponds to the first stack frame or the second stack frame, respectively, is native code if the first method or the second method is bytecode.

20. The digital apparatus of claim 17, wherein
the JAVA virtual machine searches a code buffer for a third method in native code, removes memory which is occupied by native code of the third method from the code buffer if the third method exists in the code buffer, and allocates available memory space, which is increased by removing the memory which is occupied by the native code of the third method, to the second method if the available memory space in the code buffer is not sufficient to store a machine language code which is generated by compiling bytecode of the second method using the compiler.

21. The digital apparatus of claim 17, wherein the code buffer manager translates the method into native code using a compiler, changes each of the first and second stack frames into a native code stack frame and changes the stack frame to indicate that the stack frame is a native code stack frame if each of the first method and the second method is bytecode.

22. The digital apparatus of claim 17, wherein the code buffer manager removes memory which is occupied by native code and changes each of the first stack frame and the second stack frame to indicate that the stack frame is a bytecode stack frame if each of the first method and the second method is native code.

23. The digital apparatus of claim 17, wherein the code buffer manager stores the first stack frame for the first method in the memory and stores the second stack frame in the memory if the first method calls the second method.

24. The digital apparatus of claim 23, wherein the digital apparatus returns to the first stack frame if the second method is executed completely.

25. The digital apparatus of claim 22, wherein the code buffer manager changes every stack frame for a third method or a fourth method to indicate that every stack frame for the third method or the fourth method is a bytecode stack frame.

26. The digital apparatus of claim 23, wherein the code buffer manager changes every stack frame for a third method or a fourth method to indicate that every stack frame for the third method or the fourth method is a bytecode stack frame.

27. The digital apparatus of claim 17, wherein the JAVA virtual machine is embedded in at least one of a digital TV, a mobile phone, a Personal Digital Assistant, a notebook computer, a set-top box, and a digital home appliance.

28. The method according to claim 2, further comprising changing a value of a frame type in the stack to select conversion between the bytecode and the native code.

* * * * *